(12) United States Patent
Touge (10) Patent No.: US 8,111,146 B2
(45) Date of Patent: Feb. 7, 2012

(54) ULTRASONIC SENSOR

(75) Inventor: Hiroshi Touge, Ichinomiya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 422 days.

(21) Appl. No.: 12/410,141

(22) Filed: Mar. 24, 2009

(65) Prior Publication Data

US 2009/0243826 A1  Oct. 1, 2009

(30) Foreign Application Priority Data

Mar. 27, 2008  (JP) ................................ 2008-084918

(51) Int. Cl.
*B60Q 1/00* (2006.01)
(52) U.S. Cl. ............... 340/436; 340/568.1; 340/815.69
(58) Field of Classification Search .......... 340/436, 340/815.69, 988, 903, 545.3–545.9, 567, 340/568.1
See application file for complete search history.

(56) References Cited

U.S. PATENT DOCUMENTS

| | | | |
|---|---|---|---|
| 4,507,654 A | * | 3/1985 | Stolarczyk et al. ........ 340/545.3 |
| 4,779,240 A | * | 10/1988 | Dorr ............................... 367/96 |
| 6,065,798 A | * | 5/2000 | Sankrithi ..................... 296/183.1 |
| 6,611,759 B2 | * | 8/2003 | Brosche ........................ 701/301 |
| 2005/0057050 A1 | * | 3/2005 | Saitoh et al. ............... 292/336.3 |
| 2007/0024431 A1 | * | 2/2007 | Touge ............................ 340/436 |
| 2007/0055412 A1 | * | 3/2007 | Bernhard .......................... 701/1 |
| 2007/0274159 A1 | | 11/2007 | Touge |

FOREIGN PATENT DOCUMENTS

| | | |
|---|---|---|
| JP | 2007-57527 A | 3/2007 |
| JP | 2007-138566 A | 6/2007 |
| JP | 2007-139570 A | 6/2007 |

OTHER PUBLICATIONS

U.S. Appl. No. 12/410,120, filed Mar. 24, 2009, Touge.

* cited by examiner

*Primary Examiner* — Daniel Previl
(74) *Attorney, Agent, or Firm* — Buchanan Ingersoll & Rooney PC (57) ABSTRACT

An ultrasonic sensor provided at a flip-up back door that opens and closes via a pivot shaft provided at a rear top of a vehicle, the ultrasonic sensor detecting an object in a vicinity of the vehicle by intermittently transmitting an ultrasonic wave, which hits the object to thereby generate a reflected wave as a reflection of the ultrasonic wave, the ultrasonic sensor including a sensor head provided at the back door and including a transmitter transmitting the ultrasonic wave and a receiver receiving the reflected wave, wherein the sensor head is provided at a position in a vicinity of a centerline of the vehicle in a width direction thereof and where a distance from a corner of an edge portion of the back door to the sensor head is shorter than a distance from the sensor head to a small aboveground structure provided on the ground.

13 Claims, 6 Drawing Sheets

FIG. 6C
Detection signal

ULTRASONIC SENSOR

CROSS REFERENCE TO RELATED APPLICATIONS

This application is based on and claims priority under 35 U.S.C. §119 to Japanese Patent Application No. 2008-084918, filed on Mar. 27, 2008, the entire content of which is incorporated herein by reference.

FIELD OF THE INVENTION

This invention generally relates to an ultrasonic sensor.

BACKGROUND

A known ultrasonic sensor is provided at a flip-up rear hatch (i.e., back door) that opens and closes via a pivot shaft provided at the rear top of a vehicle so that a surface of the back door is included in a detection range of the sensor. The ultrasonic sensor detects an object or an obstacle in the vicinity of the vehicle, i.e., performs an obstacle detection by intermittently transmitting an ultrasonic wave, which hits the obstacle to thereby generate a reflected wave as a reflection of the ultrasonic wave. An example of an opening and closing control system for a vehicle door equipped with such ultrasonic sensor is disclosed in JP2007-138566A (which will be hereinafter referred to as Reference 1). According to the opening and closing control system disclosed in Reference 1, an ultrasonic sensor is provided at a back door for a vehicle to transmit an ultrasonic wave so that a detection range of the sensor extends substantially along a surface of a vehicle body (specifically, the back door). The ultrasonic sensor detects a distance therefrom to an object or an obstacle and a direction where the obstacle is present based on a time interval between the ultrasonic sensor transmitting the ultrasonic wave and receiving a reflected wave from the obstacle. When the distance to the obstacle detected by the ultrasonic sensor is within a predetermined range, the opening and closing control system controls, for example, the back door to stop opening or closing. Because the ultrasonic sensor moves along with the back door when it opens or closes, an edge portion of the back door that is most away from the vehicle body upon opening and closing of the back door is constantly included within the detection range of the ultrasonic sensor. Accordingly, the opening and closing control system successfully performs the obstacle detection when the back door opens or closes, thereby opening or closing an opening portion of the vehicle based on the detection result of the ultrasonic sensor.

JP2007-139570A (which will be hereinafter referred to as Reference 2) discloses a sensor unit used for such opening and closing control system for a vehicle, an obstacle detection system, and the like. The sensor unit disclosed in Reference 2 includes a sensor head arranged next to a license plate lamp of a back door for a vehicle. In addition, JP2007-057527A (which will be hereinafter referred to as Reference 3) discloses an ultrasonic sensor of which sensor head is arranged in the vicinity of a hinge provided at an upper portion of a back door, at a vehicle emblem of the back door in view of design, and the like.

A position where the sensor head is arranged according to Reference 2 is determined, focusing on a routing of wiring, ease of connection with CAN (Controller Area Network), and the like. In addition, a position where the sensor head is arranged according to Reference 3 is determined so that the detection range of the ultrasonic sensor extends along a surface of the back door or determined in view of design. However, none of the above References discloses a method for arranging the sensor head at an appropriate position by excluding a small aboveground structure such as a curbstone and a wheel stopper provided on a road, a parking surface, and the like from the detection range of the ultrasonic sensor while securing the detection range of the ultrasonic sensor. Further, based on the aforementioned standpoint, none of the above References includes considerations or proposals on the arrangement of the sensor head at the appropriate position.

A need thus exists for an ultrasonic sensor which is not susceptible to the drawback mentioned above.

SUMMARY OF THE INVENTION

According to an aspect of the present invention, an ultrasonic sensor provided at a flip-up back door that opens and closes via a pivot shaft provided at a rear top of a vehicle, a surface of the back door being included in a detection range of the ultrasonic sensor, the ultrasonic sensor detecting an object in a vicinity of the vehicle by intermittently transmitting an ultrasonic wave, which hits the object to thereby generate a reflected wave as a reflection of the ultrasonic wave, the ultrasonic sensor including a sensor head provided at the back door and including a transmitter transmitting the ultrasonic wave and a receiver receiving the reflected wave, wherein the sensor head is provided at a position in a vicinity of a centerline of the vehicle in a width direction thereof and where a distance from a corner of an edge portion of the back door to the sensor head is shorter than a distance from the sensor head to a small aboveground structure provided on the ground.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
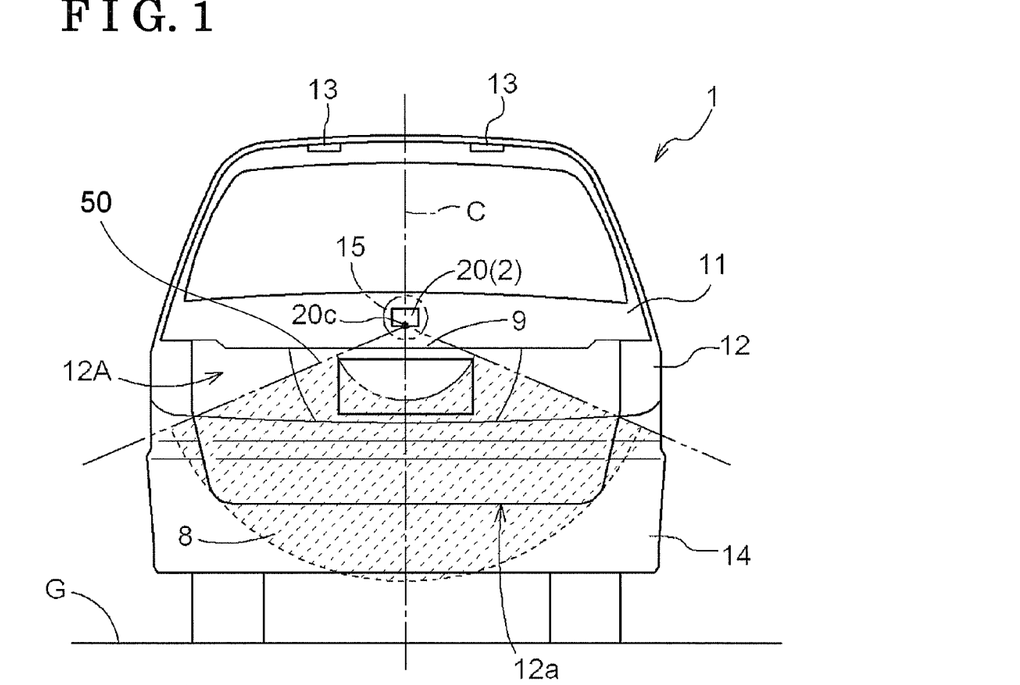
FIG. 1 is a rear view of a vehicle for illustrating a detection range of an ultrasonic sensor provided at an opening and closing control system for a vehicle according to an embodiment of the present invention.
Figure 2:
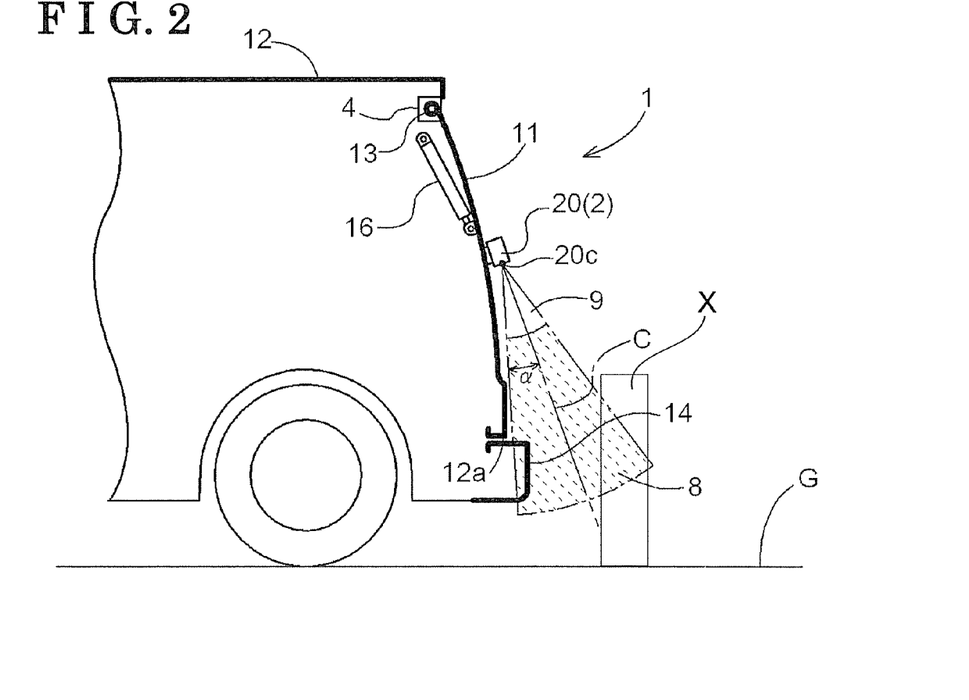
FIG. 2 is a side view of the vehicle for illustrating the detection range shown in FIG. 1.

An embodiment of an ultrasonic sensor will be explained with reference to the attached drawings. In the following, an opening and closing control system that opens and closes a rear hatch (i.e., back door) for a vehicle and where an ultrasonic sensor according to the present embodiment is mounted will be explained as an example. FIG. 1 is a rear view of a vehicle 1 for illustrating a detection range 8 of an ultrasonic sensor 2 provided at the opening and closing control system. FIG. 2 is a side view of the vehicle 1 for illustrating the detection range 8 shown in FIG. 1. A back door 11 for the vehicle 1 is a pivotal door opening and closing in a vertical direction of the vehicle 1. The vehicle 1 is placed on a ground G in FIGS. 1 and 2.

The ultrasonic sensor 2 transmits an ultrasonic wave, which hits an object or an obstacle such as an obstacle X to thereby generate a reflected wave as a reflection of the ultrasonic wave. The reflected wave is then received back by the ultrasonic sensor 2. The ultrasonic sensor 2 detects a distance therefrom to the obstacle X based on a time interval from the transmission of the ultrasonic wave to the reception of the reflected wave. A control portion, i.e., a door ECU 3 (which will be explained in detail later) determines that the obstacle X is present when the distance detected by the ultrasonic sensor 2 is within a predetermined range. The control portion alerts, on the basis of the determination result of the ultrasonic sensor 2, a driver or a user of a presence of the obstacle X by a buzzer, a warning display, and the like, or controls a drive portion, i.e., a door actuator 4. For example, in a case where it is determined that the obstacle X is present, the control portion controls the back door 11 to stop opening or closing, and the like. As a result, the back door 11 is prevented from making contact with the obstacle X.

As illustrated in FIG. 1, a sensor head 20 of the ultrasonic sensor 2 is arranged at a substantially center portion of the back door 11 in the vicinity of a portion where a vehicle emblem 15 is generally provided, i.e., in the vicinity of the vehicle emblem 15 provided at a slightly upper side of a license plate 50. The back door 11 rotates about a hinge 13 serving as a pivot shaft. A detailed position where the sensor head 20 is arranged will be explained in detail later. A center axis C of the sensor head 20 in a transmission direction thereof inclines downward so as to extend substantially along a surface 12A of the back door 11 as illustrated in FIG. 2. The term "the center axis C extends substantially along the surface 12A of the back door 11" specifically means that an angle formed between the center axis C and the surface 12A is within 45 degrees. The detection range 8 is formed into a fan shape in a planar view as illustrated in FIG. 1 and is formed into a frusto-conical shape in a spatial view as illustrated in FIG. 2. Because of a principle of the ultrasonic sensor 2, the ultrasonic sensor 2 includes a non-detection range 9 in the vicinity of the sensor head 20 where resonance of a transmitted wave from the ultrasonic sensor 2 changes to a received wave and thus an obstacle is not detectable.

In a case where an elevation angle α in FIG. 2 is defined in a range from 0 degree (inclusive) to 60 degrees (inclusive), even the low-output ultrasonic sensor is applicable. In a case where the elevation angle α is defined in a range from 0 degree (inclusive) to 45 degrees (inclusive), the detection sensitivity of the ultrasonic sensor 2 is further improved. The elevation angle α may be around 90 degrees. In this case, the surface 12A of the back door 11 is fully and entirely detectable.

Figure 3:
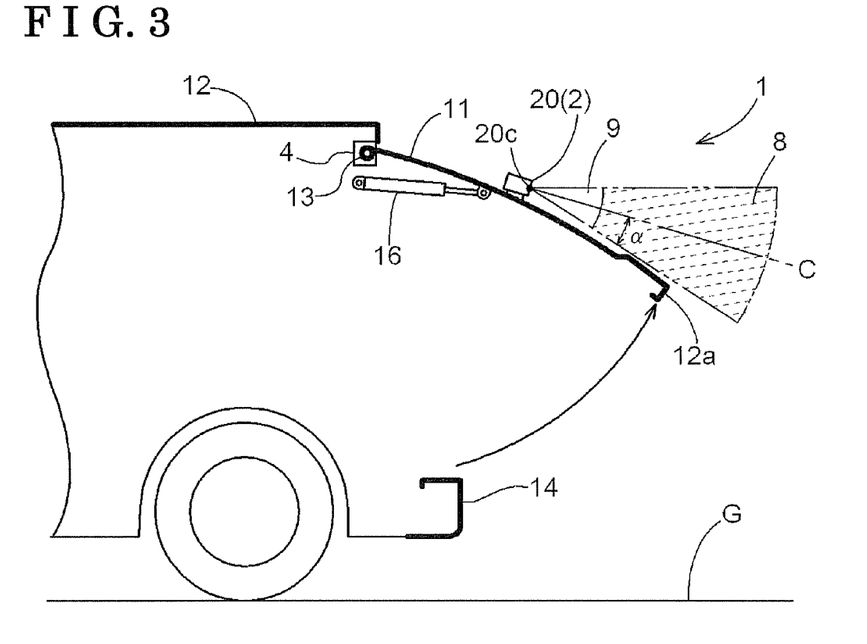
FIG. 3 is a side view of the vehicle for illustrating the detection range when a back door shown in FIG. 1 is opened.

Because the sensor head 20 of the ultrasonic sensor 2 is arranged at the back door 11, the ultrasonic sensor 2 moves along with the back door 11 when the back door 11 opens or closes. Thus, as illustrated in FIG. 3, the center axis C of the ultrasonic sensor 2 is constantly positioned along the surface 12A of the back door 11. The detection range 8 moves along with the opening of the back door 11. Thus, in a case where the obstacle X is present along a path of the back door 11 that is opening, the obstacle X is easily detectable.

Further, as illustrated in FIGS. 1 to 3, the detection range 8 of the ultrasonic sensor 2 includes an edge portion 12a (i.e., edge of the surface 12A) of the back door 11 at an opening and closing side opposite from a side where the hinge 13 is provided. The edge portion 12a of the back door 11 first starts moving when the back door 11 starts opening, i.e., the edge portion 12a is most likely to make contact with the obstacle X. Accordingly, the edge portion 12a is included in the detection range 8 of the ultrasonic sensor 2 to thereby further secure an obstacle detection thereof while the back door 11 is opening.

Figure 4:
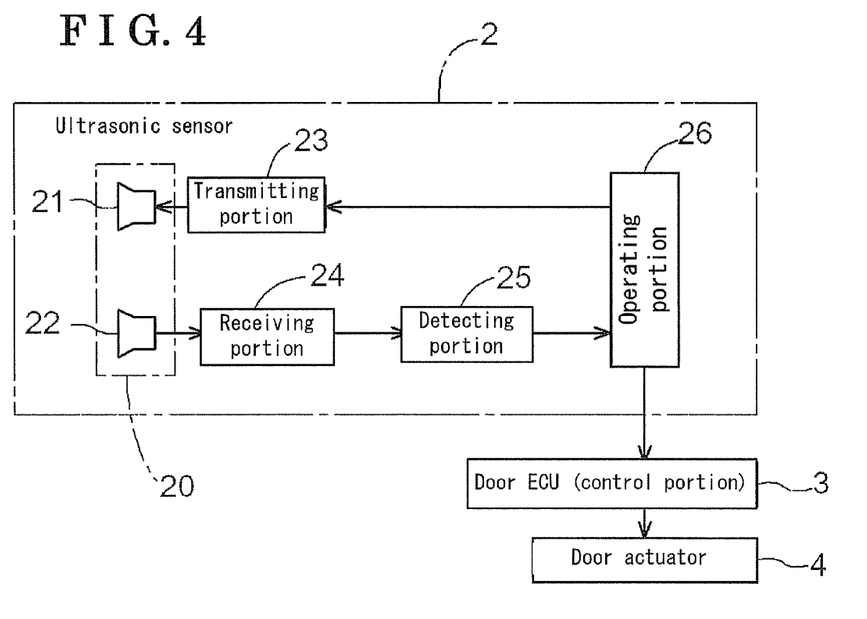
FIG. 4 is a block diagram schematically illustrating an example of a structure of the opening and closing control system according to the embodiment of the present invention.

FIG. 4 is a block diagram schematically illustrating a structure example of the opening and closing control system according to the present embodiment. As illustrated in FIG. 4, the opening and closing control system includes the ultrasonic sensor 2, the door actuator 4 for driving the back door 11 to open and close, and the door ECU 3 serving as the control portion for driving the door actuator 4 based on the detection result of the ultrasonic sensor 2 and controlling the back door 11 to open and close with an assistance of a gas spring 16. The ultrasonic sensor 2 includes the sensor head 20 constituted by a transmitter 21 and a receiver 22, a transmitting portion 23, a receiving portion 24, a detecting portion 25, and an operating portion 26. The transmitting portion 23 is a functional portion for causing the transmitter 21 to transmit the ultrasonic wave (i.e., transmitted wave) based on a transmission command output from the operating portion 26. The receiving portion 24 is a functional portion for receiving the ultrasonic wave received by the receiver 22 (i.e., received wave) as an electrical signal. The detecting portion 25 is a functional portion for detecting the received wave. The operating portion 26 is a functional portion for causing the transmitting portion 23 to send the transmitted wave. In addition, the operating portion 26 detects whether or not an obstacle such as the obstacle X is present on the basis of the detection result by the detecting portion 25 and calculates a distance to the obstacle X when it is detected that the obstacle X is present.

Figure 5:
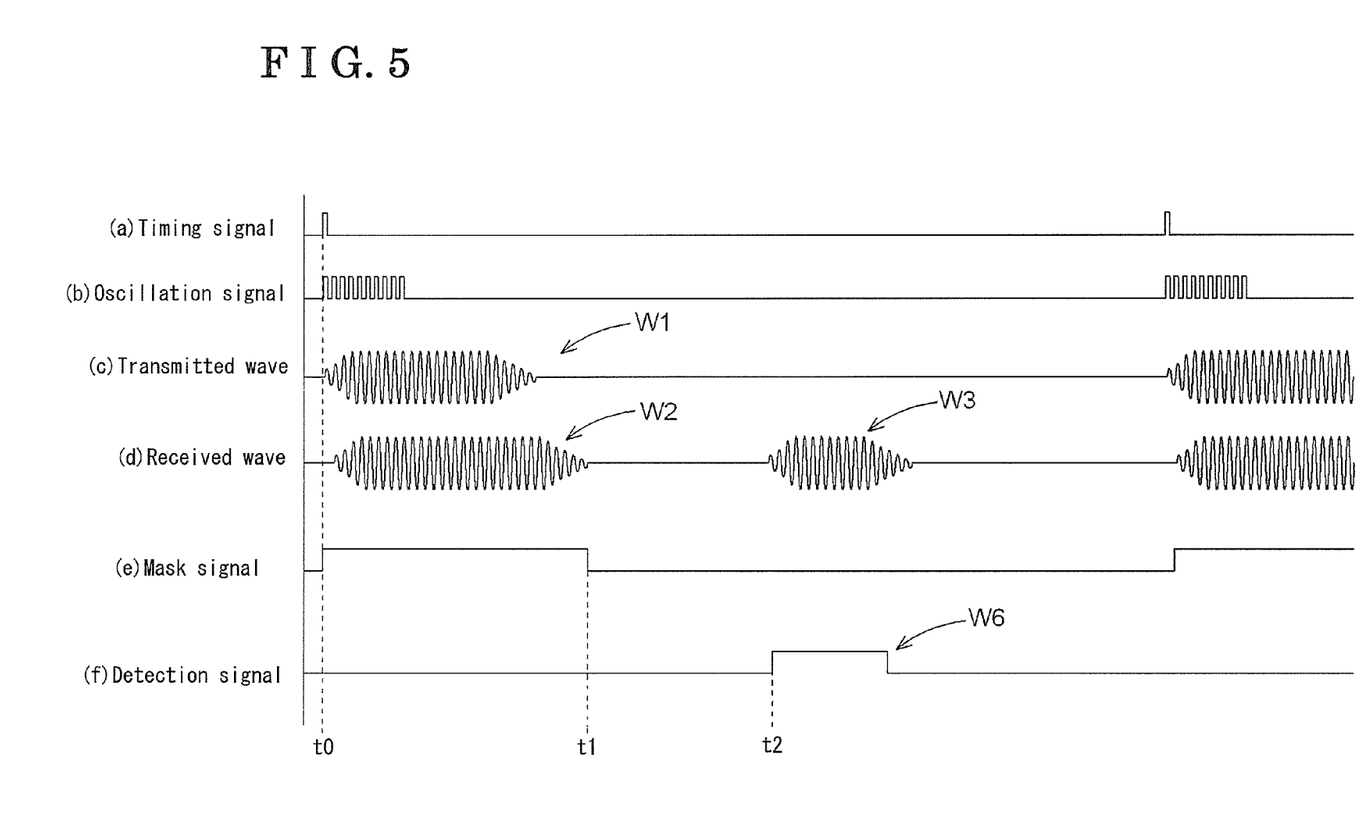
FIG. 5 is a timing chart illustrating a basic operation of an obstacle detection performed by the ultrasonic sensor according to the embodiment of the present invention.
Figures 6A, 6B:
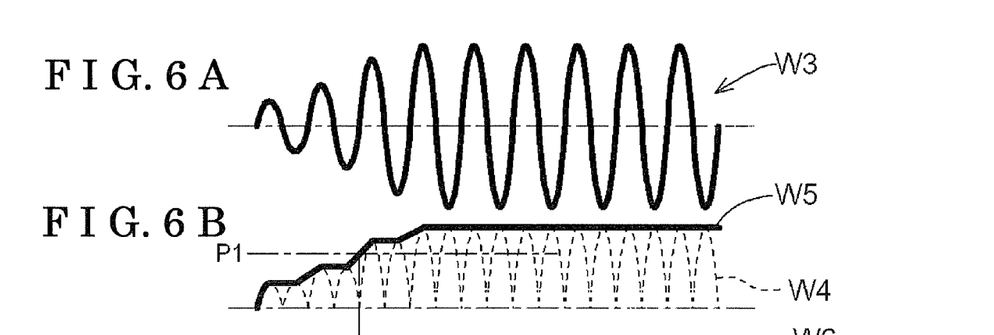
FIGS. 6A to 6C are waveform charts each explaining a wave detection performed by the ultrasonic sensor according to the embodiment of the present invention.
Figure 6C:
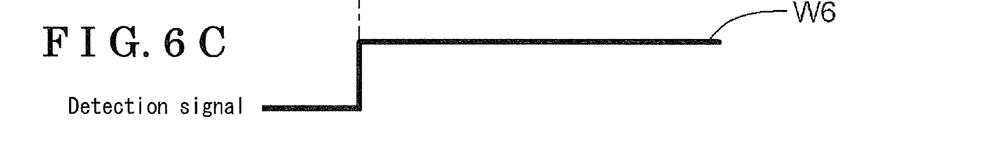

Next, a principle for detecting the obstacle X by the ultrasonic sensor 2, and an overview of the opening and closing control system by which the back door 11 is controlled to open and close on the basis of the detection result of the ultrasonic sensor 2 will be explained below. FIG. 5 is a timing chart illustrating a basic operation of the obstacle detection performed by the ultrasonic sensor 2. FIGS. 6A to 6C are waveform charts each explaining a wave detection by the detecting portion 25. Each of the functional portions of the ultrasonic sensor 2 will be explained in detail below with reference to FIGS. 5 and 6.

As illustrated in (a) of FIG. 5, the operating portion 26 outputs a timing signal to the transmitting portion 23 at time t0. The timing signal is repeatedly output at a predetermined time interval (for example, 10 ms to 100 ms). Upon reception of the timing signal, the transmitting portion 23 outputs an oscillation signal corresponding to the predetermined number of pulse signals to the transmitter 21 of the sensor head 20 as illustrated in (b) of FIG. 5. The transmitter 21 oscillates when receiving the oscillation signal and outputs a burst ultrasonic wave (i.e., a burst wave) as a transmitted wave W1 as illustrated in (c) of FIG. 5. In (c) of FIG. 5, the greater burst wave is output relative to the oscillation signal because of the resonance of the transmitter 21.

The receiver 22 and the transmitter 21 are arranged adjacent to each other, constituting the sensor head 20. Thus, the receiver 22 arranged in the vicinity of the transmitter 21 directly receives the ultrasonic wave transmitted by the transmitter 21 as illustrated in (d) of FIG. 5. In addition, a bumper 14 serving as a projection portion is provided at a portion of the vehicle 1 relatively close to the sensor head 20. More specifically, the bumper 14 faces the edge portion 12a and extends from the vehicle 1 (specifically, a vehicle body 12) relative to the edge portion 12a. Thus, the transmitted wave from the transmitter 21 is reflected by the bumper 14 and the resulting reflected wave is input to the receiver 22.

An example shown in (d) of FIG. 5 simulates a case where the reflected wave from the bumper 14 reaches the receiver 22 during a time interval where the resonance of the transmitter 21 still remains. A duration of a received wave W2 shown in (d) of FIG. 5 is longer than a duration of the transmitted wave W1 shown in (c) of FIG. 5 accordingly. A received wave W3 shown in (d) of FIG. 5 simulates the reflected wave from the obstacle X. In order to distinguish the received wave W2 from the received wave W3 serving as the reflected wave from the obstacle X, the received wave W2 including the transmitted wave W1 and the reflected wave from the bumper 14 will be hereinafter referred to as an initial received wave.

A mask signal shown in (e) of FIG. 5 is a recognition signal for preventing the detecting portion 25 and the operating portion 26 from detecting the initial received wave W2 including the transmitted wave W1 and the reflected wave from the bumper 14 as the reflected wave from the obstacle X and from performing the obstacle detection. According to the present embodiment, the detection by the detecting portion 25 is not performed on the initial received wave W2. Alternatively, the detection by the detecting portion 25 may be performed on all received waves and the operating portion 26 may determine whether or not the obstacle X is present on the basis of the mask signal. The mask signal is active within a time interval from time t0 time t1, which is called a mask period.

In (d) of FIG. 5, the received wave W3 is the reflected wave from the obstacle X. The detecting portion 25 is the functional portion for detecting the received wave W3. The received wave W3 shown in FIG. 6A is full wave rectified by the detecting portion 25 to thereby obtain a waveform W4 as illustrated by a wavy line (a dashed line) in FIG. 6B. Then, an envelope processing is performed on the waveform W4 to thereby obtain an envelope curve W5. Next, the detecting portion 25 performs a comparison calculation on the envelope curve W5 with a threshold value P1, for example, thereby obtaining a detection signal W6 as illustrated in FIG. 6C and (f) of FIG. 5. A rising of the detection signal W6 corresponds to a detection start time, which is time t2 in (f) of FIG. 5.

According to the present embodiment, for the purpose of easy understanding, the detecting portion 25 determines the detection start time by the comparison between the envelope curve W5 and the threshold value P1. However, the determination of the detection start time is not limited to the aforementioned method. For example, a straight-line approximation may be performed on an increase of the envelope curve W5. Then, timing when the thus-obtained straight line and a predetermined threshold value intersect each other is used for determining the detection start time. The aforementioned threshold value P1, an amplitude center of the received wave W3, and the like may be appropriately specified as the predetermined threshold value.

The operating portion 26 calculates a distance from the sensor head 20 to the obstacle X based on a time difference between time t0 at which the timing signal is output and time t2 at which the detection is started (i.e., detection start time t2). That is, the ultrasonic wave makes a round-trip between the sensor head 20 and the obstacle X during the time difference between t0 and t2. Accordingly, by an estimation of the product of the sonic speed and a half of the time for the round-trip of the ultrasonic wave between the sensor head 20 and the obstacle X, i.e., time for one-way trip, the distance from the sensor head 20 to the obstacle X is obtained. The operating portion 26 determines the presence of the obstacle X by means of the detection signal W6 and calculates the distance to the obstacle X when it is detected that the obstacle X is present.

The calculation result of the operating portion 26 is output to the door ECU 3. When it is detected that the obstacle X is present in the vicinity of the back door 11, the door ECU 3 stops the operation of the door actuator 4, for example. Accordingly, the back door 11 is controlled to stop before making contact with the obstacle X.

With reference to FIGS. 5 and 6, the principle for detecting the obstacle X by the ultrasonic sensor 2 and the overview of the opening and closing control system by which the back door 11 is controlled to open and close on the basis of the detection result of the ultrasonic sensor 2 are explained in the above. For the purpose of easy explanation, one receiver 22 is provided in the aforementioned explanation. However, even though the distance to the obstacle X is obtained by the calculation, a position or a direction where the obstacle X is present cannot be obtained by only the one receiver 22. At least two of the receivers 22 are necessary for detecting the direction of the obstacle X in addition to the distance thereto.

Figure 7:
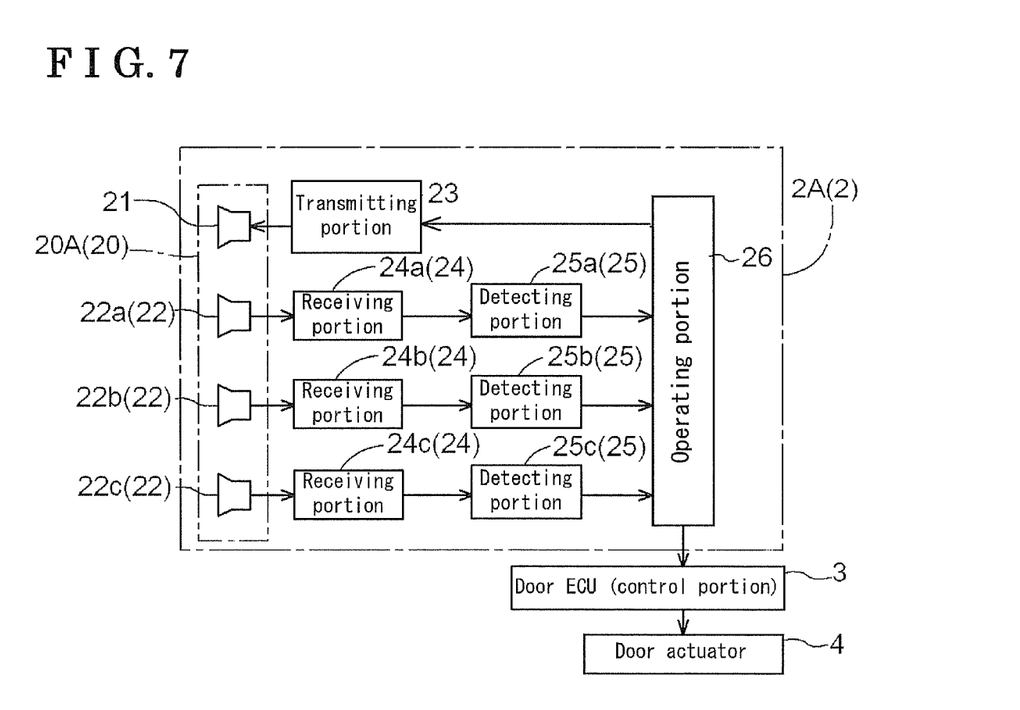
FIG. 7 is a block diagram schematically illustrating another example of the structure of the opening and closing control system according to the embodiment of the present invention.
Figure 8:
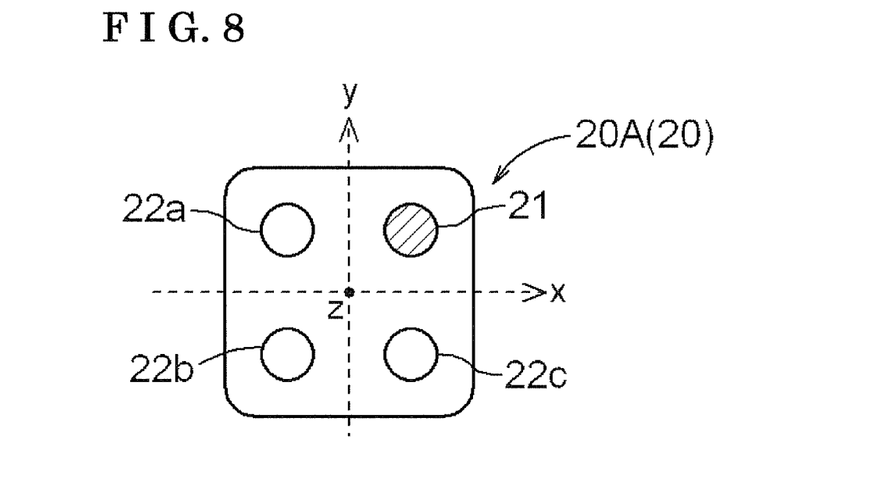
FIG. 8 is an explanatory view illustrating an example of a sensor head of the ultrasonic sensor.

FIGS. 7 and 8 each illustrate an ultrasonic sensor 2A that also detects a direction where the obstacle X is present. FIG. 7 is a block diagram schematically illustrating another structure example of the opening and closing control system including the ultrasonic sensor 2A. FIG. 8 is an explanatory view illustrating a sensor head 20A of the ultrasonic sensor 2A.

As illustrated in FIGS. 7 and 8, the ultrasonic sensor 2A includes four oscillating portions, i.e., one transmitter 21 and three receivers 22a, 22b, and 22c. The four oscillating portions are arranged at respective corners, i.e., in the vicinity of respective vertexes, of a square shape of the sensor head 20A. In FIG. 8, an x-axis corresponds to a vehicle width direction, a z-axis extends along the center axis C of the ultrasonic sensor 2A in the transmission direction thereof, and a y-axis is perpendicular to the x-axis and the y-axis. A half wavelength of the transmitted wave from the transmitter 21 is sufficiently smaller than a distance to each of the adjacent oscillating portions in a direction of each side of the square shape of the sensor head 20A. The ultrasonic sensor 2A includes the three receivers 22a, 22b, and 22c to thereby three-dimensionally detect a position of the obstacle X.

The ultrasonic sensor 2A includes three receiving portions 24a, 24b, and 24c corresponding to the three receivers 22a, 22b, and 22c, respectively, as illustrated in FIG. 7. In addition, the ultrasonic sensor 2A includes three detecting portions 25a, 25b, and 25c corresponding to the three receiving portions 24a, 24b, and 24c, respectively. Because the three receivers 22a, 22b, and 22c are located in different positions from one another, distances to the obstacle X from the receivers 22a, 22b, and 22c are different from one another. That is, the three receiving portions 24a, 24b, and 24c receive the reflected wave from the object X at different timings. The detection start times that the three detecting portions 25a, 25b, and 25c determine, respectively, are different from one another accordingly. A geometrical relationship among the three receivers 22a, 22b, and 22c is a known information for the operating portion 26. Thus, the operating portion 26 obtains the direction where the obstacle X is present by a known triangulation calculation based on the distance to the obstacle X from each of the receivers 22a, 22b, and 22c, and the geometrical relationship among the receivers 22a, 22b, and 22c.

As mentioned above, the ultrasonic sensor 2 according to the present embodiment mounted onto the opening and closing control system for a vehicle excellently detects the obstacle X present in the vicinity of the vehicle 1. In order to exercise a performance of the ultrasonic sensor 2 at a maximum, the sensor head 20 is desirably arranged at an appropriate position. An appropriate mounting position of the sensor head 20 will be explained in detail below.

Figure 9:
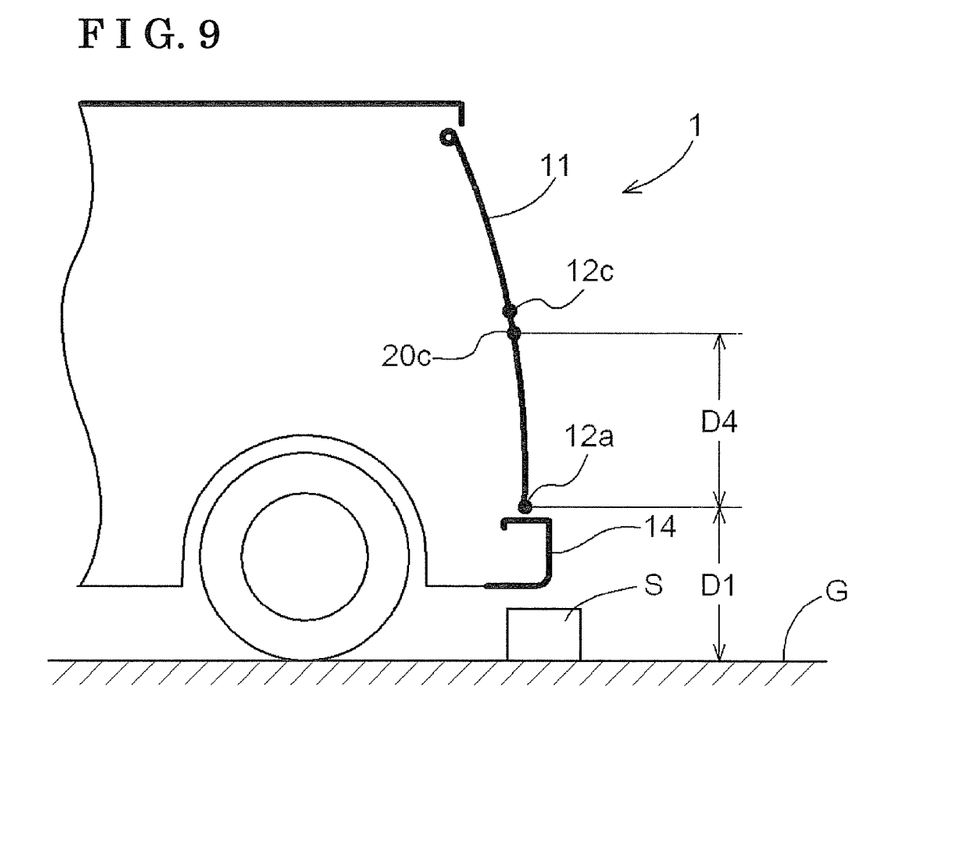
FIG. 9 is a side view of the vehicle for illustrating an appropriate mounting position of the sensor head.
Figure 10:
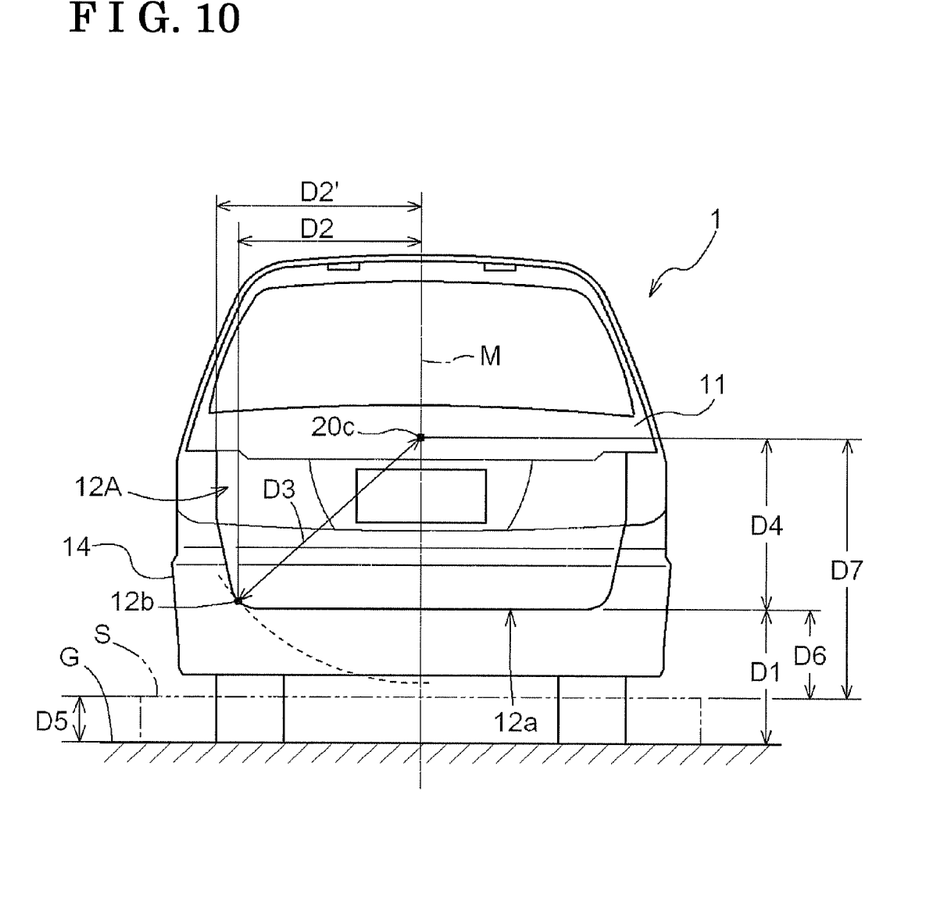
FIG. 10 is a rear view of the vehicle for illustrating the appropriate mounting position of the sensor head.

FIG. 9 is a side view of the vehicle 1 for illustrating the appropriate mounting position of the sensor head 20. FIG. 10 is a rear view of the vehicle 1 for illustrating the appropriate mounting position of the sensor head 20. In FIGS. 9 and 10, the sensor head 20 is mounted at a mounting position 20c. The mounting position 20c of the sensor head 20A shown in FIG. 8, for example, is desirably provided at an intersection between the z-axis and the sensor head 20A. In FIGS. 9 and 10, a small aboveground structure such as a curbstone and a wheel stopper (hereinafter comprehensively referred to as a curbstone S) is provided on the ground such as a road, a parking surface, and the like. The ultrasonic sensor 2 is desirably arranged at a position so as to detect the obstacle X that may influence the opening or closing operation of the back door 11, without detecting the curbstone S as an obstacle.

In FIG. 10, a value D1 is a distance from the ground G to the edge portion 12a of the back door 11. A value D2 is a half-length of the edge portion 12a of the back door 11 in the vehicle width direction. In this case, the value D2 may be replaced by a value D2', which is a half-length of the maximum width of the back door 11. A value D3 is a length from the mounting position 20c of the sensor head 20 to a corner 12b of the edge portion 12a of the back door 11. A value D4 is a length from the mounting position 20c of the sensor head 20 to the edge portion 12a of the back door 11 in the vertical direction. A value D5 is a height of the curbstone S from the ground G.

The mounting position 20c of the sensor head 20 desirably satisfies a following mathematical expression I while being specified in the vicinity of a centerline M in the vehicle width direction of the vehicle 1.

$$\sqrt{(D2^2+D4^2)} < D4+D1-D5 \qquad \text{[Mathematical expression I]}$$

In this case, according to the Pythagorean theorem, a left-hand side of the aforementioned mathematical expression I ($\sqrt{(D2^2+D4^2)}$) is equal to the value D3. Further, when a distance from the edge portion 12a of the back door 11 to the curbstone S, i.e., "D1-D5", is specified to be a value D6, the aforementioned mathematical expression I is replaced by a mathematical expression II as below.

$$D3 < D4+D6 \qquad \text{[Mathematical expression II]}$$

The above mathematical expression II indicates a condition for arranging the mounting position 20c of the sensor head 20 in which the detection range 8 includes the coiner 12b of the edge portion 12a of the back door 11 and excludes, specifically, does not reach, the curbstone S in a direction of the ground G in a case where the sensor head 20 is provided at the mounting position 20c of the sensor head 20 as illustrated in FIG. 10. As seen from FIG. 10, a right-hand side of the mathematical expression II, i.e., "D4+D6" is equal to a value D7 that is a distance from the mounting position 20c of the sensor head 20 to the curbstone S. Thus, the mounting position 20c of the sensor head 20 is desirably determined so as to satisfy a condition where the distance D3 from the corner 12b of the edge portion 12a of the back door 11 to the sensor head 20 is shorter than the distance D7 from the sensor head 20 to the curbstone S.

In the mathematical expression II, the value D3 is variable depending on the mounting position 20c of the sensor head 20. Thus, the value D3 should be appropriately defined. The value D3 is determined on the basis of the values D2 and D4 in the mathematical expression I. The value D2 is determined by the vehicle 1, i.e., the value D2 is specific to the vehicle 1, and therefore the value D4 is a variable value. Thus, the appropriate determination of the value D4 enables the mounting position 20c of the sensor head 20 to be provided at the appropriate position. In order to obtain the value D4 based on the mathematical expressions I and II, a mathematical expression III is acquired as below.

$$D4 \geq \frac{D2^2 - D6^2}{2 \cdot D6} \qquad \text{[Mathematical expression III]}$$

The value D4 is a minimum distance that should be maintained above the edge portion 12a of the back door 11 upon mounting of the sensor head 20. Thus, the mounting position 20c of the sensor head 20 is appropriately provided higher than the edge portion 12a of the back door 11 by the distance D4 or greater. For example, in a case where the height of the curbstone S (D5) is 20 cm, the width of the back door 11 (D2×2) is 138 cm, and the height from the ground G to the edge portion 12a of the back door 11 (D1) is 68 cm, then the distance D4 is equal to or greater than 26 cm.

Accordingly, the sensor head 20 is desirably provided at a position in the vicinity of the centerline M in the vehicle width direction of the vehicle 1 and where the distance from the corner 12b of the edge portion 12a of the back door 11 to the sensor head 20A is shorter than the distance from the sensor head 20A to the small aboveground structure such as the curbstone S that may be provided on the ground.

As illustrated in FIG. 9, the sensor head 20 is further desirably provided at a position between a top portion 12c of a curved shape of the back door 11 in a vertical direction of the vehicle 1 and the edge portion 12a of the back door 11. Generally, the back door 11 of the vehicle 1 is curved in a vertical direction and a right-left direction of the vehicle 1 so as to extend in a rearward direction thereof. Thus, if the sensor head 20 is arranged at an upper portion of the back door 11, the edge portion 12a of the back door 11 may become a blind spot of the sensor head 20 because of the curved shape of the back door 11. When the sensor head 20 is provided between the peak portion 12c of the curved shape of the back door 11 and the edge portion 12a of the back door 11, the sensor head 20 faces the edge portion 12a of the back door 11. Thus, the edge portion 12a to which the obstacle detection is most desired is included in the detection range 8.

Accordingly, the sensor head 20 of the ultrasonic sensor 2 that detects the obstacle X present in the vicinity of the vehicle is provided at the appropriate position.

In a case where the sensor head 20 is arranged in the vicinity of the centerline M in the vehicle width direction, distances from the sensor head 20 to edges of the back door 11 on the light side and the left side are equal to each other, thereby effectively utilizing the detection range 8 of the ultrasonic sensor 2. In addition, as long as the sensor head 20 is arranged in such a way that at least the corner 12b of the edge portion 12a of the back door 11 is included in the detection range 8, the edge portion 12a of the back door 11 is substantially fully included in the detection range 8. Accordingly, a portion that moves the longest distance when the back door 11 opens or closes, i.e., the edge portion 12a of the back door 1, is included in the detection range 8 of the ultrasonic sensor 2. In addition, the sensor head 20 is provided at the position so that the distance from the corner 12b of the edge portion 12a of the back door 11 to the sensor head 20 is shorter than the distance from the sensor head 20 to the small aboveground structure that may be provided on the ground. Therefore, even when the detection range 8 is specified to be small so as not to detect the small aboveground structure as an obstacle, the edge portion 12a of the back door 11 is securely included in the detection range 8. According to the structure of the present embodiment, the sensor head 20 of the ultrasonic sensor 2 that detects the obstacle in the vicinity of the vehicle 1 is provided at the appropriate position.

The back door 11 is formed into a curved shape to extend in a rearward direction of the vehicle 1, and the sensor head 20 or 20A is provided at the position between the top portion 20c of the curved shape of the back door 11 in a vertical direction of the vehicle 1 and the edge portion 12a of the back door 11.

Because the sensor head 20 is positioned in the aforementioned manner, the sensor head 20 faces the edge portion 12a of the back door 11, which is included in the detection range 8.

The small aboveground structure includes the curbstone S provided on the ground.

The back door 11 is driven to open or close after the vehicle 1 is parked, mostly at a roadside or a parking lot. In such place, the curbstone S serving as the small aboveground structure is most likely to exist. Thus, considering the curbstone S as the basis for the small aboveground structure for determining the position where the sensor head 20 is provided, the versatile ultrasonic sensor 2 is achievable.

The position where the sensor head 20 or 20A is provided is in the vicinity of the license plate 50 provided at the surface 12A of the back door 11.

The vicinity of the license plate 50 is positioned close to the hinge 13 relative to the license plate 50.

The position where the sensor head 20 or 20A is provided is in the vicinity of the vehicle emblem 15 arranged at an upper side of the license plate 50 provided on the surface 12A of the back door 11.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An ultrasonic sensor adapted to be provided at a flip-up back door that opens and closes via a pivot shaft provided at a rear top of a vehicle, a surface of the back door being included in a detection range of the ultrasonic sensor, the ultrasonic sensor detecting an object in a vicinity of the vehicle by intermittently transmitting an ultrasonic wave, which hits the object to thereby generate a reflected wave as a reflection of the ultrasonic wave, the ultrasonic sensor comprising:

a sensor head provided at the back door and including a transmitter transmitting the ultrasonic wave and a receiver receiving the reflected wave, wherein the sensor head is provided at a position in a vicinity of a centerline of the vehicle in a width direction thereof and where a distance from a corner of a distal end edge portion of the back door to the sensor head is shorter than a distance from the sensor head to a small aboveground structure provided on the ground.

2. The ultrasonic sensor according to claim 1, wherein the back door is formed into a curved shape to extend in a rearward direction of the vehicle, and the sensor head is provided at the position between a top portion of the curved shape of the back door in a vertical direction of the vehicle and the edge portion of the back door.

3. The ultrasonic sensor according to claim 1, wherein the small aboveground structure includes a curbstone provided on the ground.

4. The ultrasonic sensor according to claim 1, wherein the position where the sensor head is provided is in a vicinity of a license plate provided at a surface of the back door.

5. The ultrasonic sensor according to claim 4, wherein the vicinity of the license plate is positioned close to the pivot shaft relative to the license plate.

6. The ultrasonic sensor according to claim 1, wherein the position where the sensor head is provided is in a vicinity of a vehicle emblem arranged at an upper side of a license plate provided on a surface of the back door.

7. The ultrasonic sensor according to claim 6, wherein the vicinity of the license plate is positioned close to the pivot shaft relative to the license plate.

8. An ultrasonic sensor adapted for being provided at a flip-up back door which is pivoted to a rear-top of a vehicle for covering a surface of the flip-up back door and serving for detecting an object in a vicinity of the vehicle by transmitting ultrasonic waves intermittently to an object and receiving the reflected ultrasonic waves therefrom, the ultrasonic sensor comprising:

a sensor head including a transmitter transmitting the ultrasonic waves and a receiver receiving the reflected waves, the sensor head being provided at a position in a vicinity of a lateral directional centerline of the vehicle in such manner that a distance from a corner edge of a distal end portion of the back door to the sensor head is shorter than a distance from the sensor head to a small aboveground structure near the vehicle.

9. The ultrasonic sensor according to claim 8, wherein the back door is formed at its outer surface into a convex configuration including a top portion and the sensor head is placed at a position between the top portion and the distal end of the back door.

10. The ultrasonic sensor according to claim 8, wherein the small aboveground structures include a curbstone provided on the ground.

11. The ultrasonic sensor according to claim 8, wherein the position of the sensor head is in a vicinity of a license plate on the outer surface of the back door.

12. The ultrasonic sensor according to claim 11, wherein the vicinity of the license plate is positioned at a side of the pivot shaft.

13. The ultrasonic sensor according to claim 8, wherein the sensor head is positioned in a vicinity of a vehicle emblem mounted at an upper side of a license plate on the outer surface of the back door.

* * * * *